United States Patent
Hasuka (10) Patent No.: US 9,450,257 B2
(45) Date of Patent: Sep. 20, 2016

(54) FUEL CELL SYSTEM AND ITS CONTROL METHOD

(75) Inventor: Yoshinobu Hasuka, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 1705 days.

(21) Appl. No.: 12/669,159

(22) PCT Filed: Jul. 14, 2008

(86) PCT No.: PCT/JP2008/063083
§ 371 (c)(1),
(2), (4) Date: Jan. 14, 2010

(87) PCT Pub. No.: WO2009/016985
PCT Pub. Date: Feb. 5, 2009

(65) Prior Publication Data
US 2010/0190080 A1 Jul. 29, 2010

(30) Foreign Application Priority Data
Jul. 27, 2007 (JP) ................. 2007-196457

(51) Int. Cl.
*H01M 8/04* (2016.01)

(52) U.S. Cl.
CPC ..... *H01M 8/04097* (2013.01); *H01M 8/04089* (2013.01); *H01M 8/04231* (2013.01); *H01M 8/04761* (2013.01); *H01M 8/04805* (2013.01); *H01M 8/0432* (2013.01); *H01M 8/04619* (2013.01); *H01M 8/04835* (2013.01); *Y02E 60/50* (2013.01)

(58) Field of Classification Search
CPC ................................ H01M 8/04089
USPC .................................. 429/428–451
See application file for complete search history.

(56) References Cited

U.S. PATENT DOCUMENTS

2005/0244686 A1* 11/2005 Kamihara .................... 429/22

FOREIGN PATENT DOCUMENTS

| JP | 2000-58092 A | 2/2000 |
|---|---|---|
| JP | 2003-317752 A | 11/2003 |
| JP | 2004-185974 A | 7/2004 |
| JP | 2004-206948 A | 7/2004 |
| JP | 2004-349215 A | 12/2004 |
| JP | 2005-85536 A | 3/2005 |
| JP | 2005-116220 A | 4/2005 |
| JP | 2005-141977 A | 6/2005 |
| JP | 2005-149799 A | 6/2005 |
| JP | 2005-302555 A | 10/2005 |
| JP | 2005-327596 A | 11/2005 |
| JP | 2005-327597 A | 11/2005 |
| JP | 2005-353569 A | 12/2005 |
| JP | 2006-19124 A | 1/2006 |
| JP | 2006-351318 A | 12/2006 |
| JP | 2007-48531 A | 2/2007 |
| JP | 2007-66622 A | 3/2007 |
| WO | 2004/075328 A2 | 9/2004 |
| WO | 2007/013667 A1 | 2/2007 |

* cited by examiner

*Primary Examiner* — Jonathan G Leong
(74) *Attorney, Agent, or Firm* — Kenyon & Kenyon LLP (57) ABSTRACT

Here is disclosed a fuel cell system comprising: a fuel cell; a fuel gas system which supplies a fuel gas to the fuel cell and circulates the gas discharged from the fuel cell; a purge valve which discharges the gas from the fuel gas system; and control means for controlling the opening/closing operation of the purge valve. The control means controls the opening/closing operation of the purge valve so that impurities partial pressure in the fuel gas system is constant in the entire load region.

3 Claims, 9 Drawing Sheets

FUEL CELL SYSTEM AND ITS CONTROL METHOD

This is a 371 national phase application of PCT/JP2008/063083 filed 14 Jul. 2008, which claims priority to Japanese Patent Application No. 2007-196457 filed 27 Jul. 2007, the contents of which are incorporated herein by reference.

TECHNICAL FIELD

The present invention relates to a fuel cell system and a control method of the same.

BACKGROUND ART

Heretofore, a fuel cell system including a fuel cell which generates a power by the supply of a reactant gas (a fuel gas and an oxidizing gas) has been put to practical use. It is known that in the fuel cell of such a fuel cell system or a circulation passage of a fuel off-gas, impurities of a nitrogen gas and the like are accumulated with an elapse of time during the power generation. At present, for a purpose of stabilizing the operation state of the fuel cell, there has been suggested the fuel cell system in which a purge valve is provided in a discharge passage connected to the circulation passage, and the opening and closing of the purge valve are controlled to discharge (purge) the impurities to the outside.

Moreover, in recent years, there has been suggested a technology for regulating the open degree of the purge valve so as to keep a nitrogen concentration substantially constant in a fuel gas system (a fuel gas supply passage or the circulation passage) (e.g., see JP-A-2004-185974). The employment of such a technology enables inhibiting the discharge amount of the fuel gas discharged together with the nitrogen gas.

DISCLOSURE OF THE INVENTION

A conventional fuel cell system is designed so that the partial pressure of impurities in a fuel gas system (the sum of the partial pressures of a nitrogen gas and water vapor) changes in accordance with a load onto a fuel cell, the operation temperature of the fuel cell and the like. In such a conventional fuel cell system, the shortage of the stoichiometric ratio of a fuel gas might occur during the fluctuation of the load, whereby the operation state of the fuel cell becomes unstable. In the above technology described in JP-A-2004-185974, a purge valve is controlled to stabilize the operation state of the fuel cell, but any saturated water vapor in the fuel gas system is not considered, and hence room for improvement is left in the stability of the operation state during the fluctuation of the load.

The present invention has been developed in view of such a situation, and an object thereof is to provide a fuel cell system capable of maintaining the stable operation state of a fuel cell even during the fluctuation of a load.

To achieve the above object, the fuel cell system according to the present invention comprises a fuel cell; a fuel gas system which supplies a fuel gas to the fuel cell and circulates the gas discharged from the fuel cell; a purge valve which discharges the gas from the fuel gas system; and control means for controlling the opening/closing operation of the purge valve, wherein the control means controls the opening/closing operation of the purge valve so that impurities partial pressure in the fuel gas system is constant in the entire load region.

Moreover, a control method of a fuel cell system according to the present invention is a control method of a fuel cell system including a fuel cell, a fuel gas system which supplies a fuel gas to this fuel cell and circulates the gas discharged from the fuel cell, and a purge valve which discharges the gas from the fuel gas system, the method comprising a step of controlling the opening/closing operation of the purge valve so that impurities partial pressure in the fuel gas system is constant in the entire load region.

The employment of the constitution or method enables controlling the opening/closing operation of the purge valve so that the impurities partial pressure in the fuel gas system is constant in the entire load region (from a low load region to a high load region). Therefore, the shortage of the stoichiometric ratio of the fuel gas due to the fluctuation of the impurities partial pressure accompanied by the fluctuation of the load can be inhibited. Consequently, the stable operation state of the fuel cell can be maintained even during the fluctuation of the load.

In the fuel cell system, it is possible to employ the control means for controlling the opening/closing operation of the purge valve so as to increase the amount of the gas discharged from the fuel gas system, as the operation temperature of the fuel cell rises.

Also in a case where water vapor in the fuel gas system increases owing to the rise of the operation temperature of the fuel cell, the employment of the above constitution makes it possible to effectively discharge the increased water vapor.

Moreover, in the fuel cell system, it is possible to employ the fuel gas system comprising: a fuel gas supply passage through which the fuel gas supplied from a fuel supply source flows to the fuel cell; a circulation passage through which the gas discharged from the fuel cell is circulated to the fuel gas supply passage; an on/off valve which regulates a gas pressure on the upstream side of the fuel gas supply passage to supply the gas to the downstream side; and a circulation pump which forcibly feeds the gas circulated through the circulation passage to the fuel gas supply passage. In this case, it is possible to employ the control means for setting the amount of the gas discharged through the purge valve, the pressure of the fuel gas supplied from the on/off valve to the fuel cell, and the flow rate of the gas fed to the fuel gas supply passage by the circulation pump so that the amount of the fuel gas discharged from the fuel gas system is minimum.

The employment of such a constitution enables setting the amount (the purge amount) of the gas discharged through the purge valve, the pressure (the pressure regulation value) of the fuel gas supplied from the on/off valve to the fuel cell, and the flow rate (the circulation amount) of the gas fed to the fuel gas supply passage by the circulation pump so that the amount of the fuel gas discharged from the fuel gas system is minimum. In consequence, the loss of the fuel gas can be decreased, and a fuel can be saved.

Moreover, in the fuel cell system, an injector may be employed as the on/off valve.

The injector is an electromagnetic driving type on/off valve in which a valve body is directly driven with an electromagnetic driving force for a predetermined drive cycle and detached from a valve seat, whereby a gas state (a gas flow rate or a gas pressure) can be regulated. A predetermined control unit drives the valve body of the injector to control the injection timing or injection time of the fuel gas, whereby the flow rate or pressure of the fuel cell can precisely be controlled.

According to the present invention, there can be provided the fuel cell system capable of maintaining the stable operation state even during the fluctuation of the load.

BEST MODE FOR CARRYING OUT THE INVENTION

Hereinafter, a fuel cell system 1 according to an embodiment of the present invention will be described with reference to the drawings. In the present embodiment, an example will be described in which the present invention is applied to a car-mounted power generation system of a fuel cell vehicle.

First, a constitution of the fuel cell system 1 according to the embodiment of the present invention will be described with reference to FIG. 1.

Figure 1:
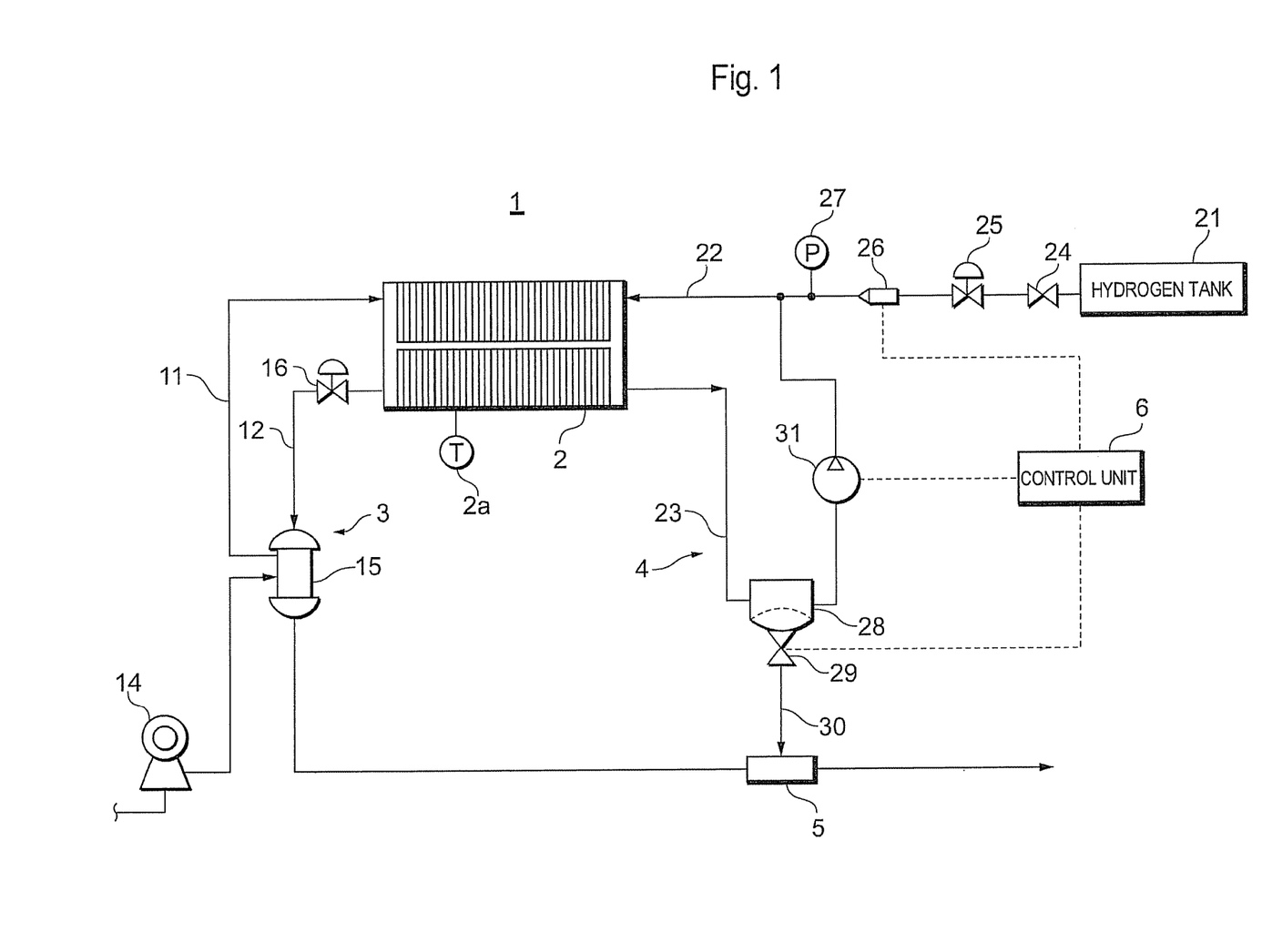
FIG. 1 is a constitution diagram of a fuel cell system according to an embodiment of the present invention.
Figure 2:
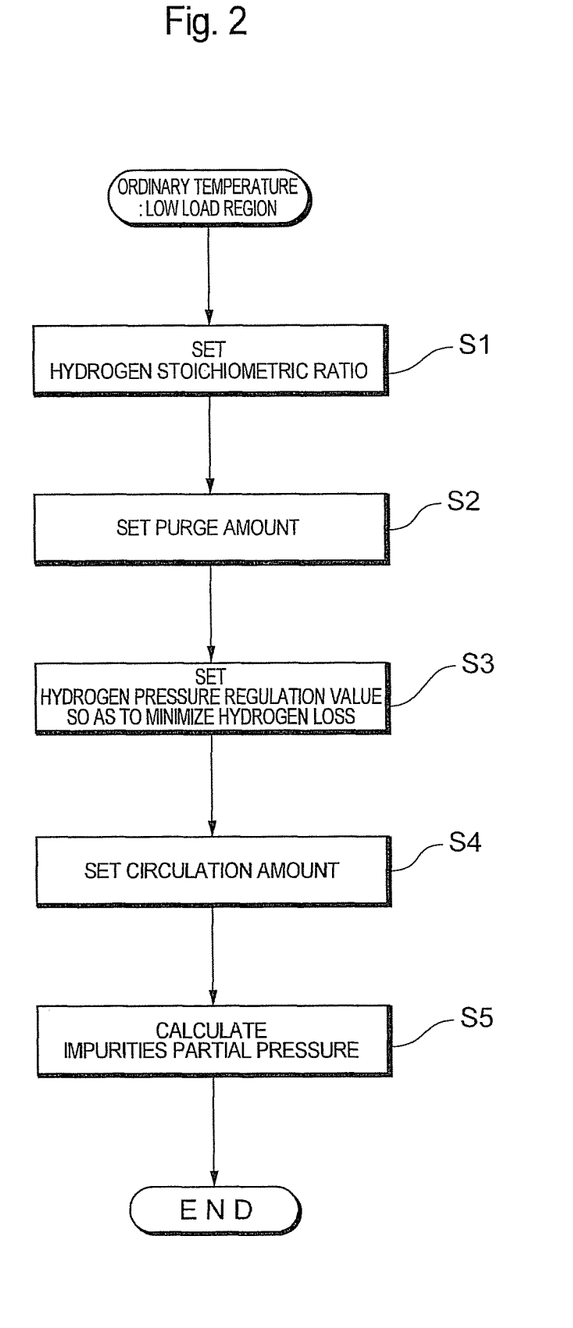
FIG. 2 is a flow chart for explaining a design method of a map of the fuel cell system shown in FIG. 1 (ordinary temperature: a low load region)

As shown in FIG. 1, the fuel cell system 1 according to the present embodiment comprises a fuel cell 2 which generates a power by the supply of a reactant gas (an oxidizing gas and a fuel gas), and the fuel cell 2 is connected to an oxidizing gas system 3 which supplies air as the oxidizing gas to the fuel cell 2 and discharges an oxidizing off-gas from the fuel cell 2, and a fuel gas system 4 which supplies a hydrogen gas as the fuel gas to the fuel cell 2 and circulates a hydrogen off-gas as a fuel off-gas together with the hydrogen gas through the fuel cell 2. The fuel gas system 4 comprises a gas/water discharge valve 29 capable of discharging the gas from the system, and the gas (the hydrogen off-gas) discharged through the gas/water discharge valve 29 can be mixed with the oxidizing off-gas (the air) discharged from the oxidizing gas system 3 in a dilution unit 5, and discharged to the outside. Moreover, the whole system is generally controlled by a control unit 6.

The fuel cell 2 has, for example, a solid polymer electrolyte type stack structure in which a large number of unitary cells (the cells) are stacked. Each unitary cell of the fuel cell 2 comprises an air pole (a cathode) on one surface of a solid polymer electrolyte membrane, a fuel pole (an anode) on the other surface thereof, and a pair of separators which sandwich the air pole and the fuel pole from both sides. The fuel gas is supplied to a passage of the separator on an anode side, and the oxidizing gas is supplied to a passage of the separator on a cathode side, whereby the fuel cell 2 generates the power. The fuel cell 2 is provided with a temperature sensor 2a which detects the operation temperature of the fuel cell. Information on the operation temperature of the fuel cell 2 detected by the temperature sensor 2a is transmitted to the control unit 6 and used to control a hydrogen circulation system.

The oxidizing gas system 3 comprises an air supply passage 11 through which the oxidizing gas to be supplied to the fuel cell 2 flows, and an exhaust passage 12 through which the oxidizing off-gas discharged from the fuel cell 2 flows. The air supply passage 11 comprises a compressor 14 which takes in the oxidizing gas, and a humidifier 15 which humidifies the oxidizing gas fed under pressure by the compressor 14. The exhaust passage 12 comprises a back pressure regulation valve 16, and is connected to the humidifier 15, whereby the oxidizing off-gas flowing, through the exhaust passage 12 passes through the back pressure regulation valve 16 to be used for water exchange in the humidifier 15, and the oxidizing off-gas is then transferred to the dilution unit 5.

The fuel gas system 4 comprises a hydrogen tank 21 as a fuel supply source in which the hydrogen gas with a high pressure is received, a hydrogen supply passage 22 as a fuel gas supply passage for supplying the hydrogen gas of the hydrogen tank 21 to the fuel cell 2, and a circulation passage 23 for returning the hydrogen off-gas discharged from the fuel cell 2 to the hydrogen supply passage 22. It is to be noted that instead of the hydrogen tank 21, a reformer which forms a hydrogen-rich reformed gas from a hydrocarbon-based fuel, and a high-pressure gas tank which brings the reformed gas formed by this reformer into a high-pressure state to accumulate the pressure may be employed as the fuel supply source. Moreover, a tank having a hydrogen occluded alloy may be employed as the fuel supply source.

The hydrogen supply passage 22 is provided with a shut valve 24 which shuts or allows the supply of the hydrogen gas from the hydrogen tank 21, a regulator 25 which regulates the pressure of the hydrogen gas, and an injector 26. Moreover, on the downstream side of the injector 26 and the upstream side of a joining part between the hydrogen supply passage 22 and the circulation passage 23, a pressure sensor 27 is provided which detects the pressure of the hydrogen gas in the hydrogen supply passage 22. Information on the pressure of the hydrogen gas detected by the pressure sensor 27 is transmitted to the control unit 6, and is used to control the hydrogen circulation system.

The regulator 25 is a device which regulates the upstream pressure (the primary pressure) of the regulator into a preset secondary pressure. In the present embodiment, a mechanical pressure reduction valve which decreases the primary pressure is employed as the regulator 25. As the constitution of the mechanical pressure reduction valve, there may be employed a known constitution comprising a housing provided with a back pressure chamber and a pressure regulation chamber formed via a diaphragm, whereby the primary pressure is decreased to a predetermined pressure by the back pressure of the back pressure chamber to form the secondary pressure in the pressure regulation chamber.

The injector 26 is an electromagnetic driving type on/off valve in which a valve body is directly driven with an electromagnetic driving force for a predetermined drive cycle and the valve body is detached from a valve seat, whereby a gas flow rate or a gas pressure can be regulated. In the present embodiment, as shown in FIG. 1, the injector 26 is disposed on the upstream side of the joining part between the hydrogen supply passage 22 and the circulation passage 23. The injector 26 comprises the valve seat having an injection hole which injects a gas fuel such as the hydrogen gas, and also comprises a nozzle body which supplies and guides the gas fuel to the injection hole, and the valve body movably received and held in an axial direction (a gas flow direction) with respect to the nozzle body to open or close the injection hole. In the present embodiment, the valve body of the injector 26 is driven by a solenoid which is an electromagnetic driving device, and a pulse-like excitation current supplied to the solenoid can be turned on or off to switch the open area of the injection hole in two stages or multiple stages. The gas injection time and gas injection timing of the injector 26 are controlled in accordance with a control signal output from the control unit 6 to precisely control the flow rate and pressure of the hydrogen gas. The injector 26 has a constitution in which the valve (the valve seat and valve body) is directly driven with the electromagnetic driving force to open or close, and the drive cycle of the injector can be controlled up to a high response region, so that the injector has a high response.

In the injector 26, to supply the gas to the downstream side of the injector at a requested flow rate, at least one of the open area (the open degree) and open time of a valve provided in the gas passage of the injector 26 is changed to regulate the flow rate of the gas supplied to the downstream side (the fuel cell 2 side) or regulate a hydrogen molecular concentration. It is to be noted that the valve of the injector 26 is opened or closed to regulate the gas flow rate, and the pressure of the gas supplied to the downstream side of the injector 26 is decreased as compared with a gas pressure on the upstream side of the injector 26, so that the injector 26 may be interpreted as a pressure regulation valve (the pressure reduction valve, the regulator). Moreover, in the present embodiment, the injector may be interpreted as a variable pressure regulation valve which can change the pressure regulation amount (the pressure reduction amount) of the upstream gas pressure of the injector 26 in accordance with a gas request so that the pressure matches a requested pressure in a predetermined pressure range.

The circulation passage 23 is connected to a discharge passage 30 via a gas-liquid separator 28 and the gas/water discharge valve 29. The gas-liquid separator 28 takes water from the hydrogen off-gas. The gas/water discharge valve 29 operates by a command from the control unit 6 to discharge (purge), to the outside, the water taken by the gas-liquid separator 28 and the hydrogen off-gas (the fuel off-gas) including impurities in the circulation passage 23, and the valve functions as one embodiment of a purge valve in the present invention. Such purging is executed to lower impurities partial pressure, thereby increasing the concentration of the hydrogen gas supplied to the fuel cell 2. Moreover, the circulation passage 23 is provided with a circulation pump 31 which pressurizes the hydrogen off-gas in the circulation passage 23 to feed the off-gas to a hydrogen supply passage 22 side. It is to be noted that the hydrogen off-gas discharged through the gas/water discharge valve 29 and the discharge passage 30 joins the oxidizing off-gas of the exhaust passage 12 in the dilution unit 5 where the off-gas is diluted.

The control unit 6 detects the operation amount of an accelerating operation member (an accelerator or the like) provided in a vehicle, and receives control information such as an acceleration request value (a requested power generation amount from a load device such as a traction motor), thereby controlling the operations of various devices in the system. It is to be noted that examples of the load device generically include the traction motor; additional auxiliary devices necessary for operating the fuel cell 2 (e.g., a motor of the compressor 14, a motor of the circulation pump 31, etc.); actuators used in various devices associated with the running of the vehicle (a change gear, a wheel control unit, a steering device, a suspension device, etc.); and power consumption devices including an air conditioning device (the air conditioner), an illumination, an audio and the like in a passenger space.

The control unit 6 is a computer system (not shown). Such a computer system comprises a CPU, an ROM, an RAM, an HDD, an input/output interface, a display and the like, and the CPU reads various control programs recorded in the ROM to execute desired calculation, thereby performing various processing and control including purge control described later.

Specifically, in accordance with a load (the requested power generation amount from the load device), the control unit 6 sets, based on predetermined maps (FIGS. 6A to 6C), the target value (the purge amount) of the discharge amount of the gas discharged through the gas/water discharge valve 29, the target value (the hydrogen pressure regulation value) of the pressure of the hydrogen gas supplied from the injector 26 to the fuel cell 2, and the target value (the circulation amount) of the flow rate of the gas fed from the circulation passage 23 to the hydrogen supply passage 22. In this case, the control unit 6 sets control parameters (the purge amount, the hydrogen pressure regulation value and the circulation amount) so that the impurities partial pressure in the fuel gas system 4 is constant and the amount of the hydrogen gas discharged from the fuel gas system 4 is minimum in the entire load region (from a low load region to a high load region). Moreover, the control unit 6 controls the operations of the gas/water discharge valve 29, the injector 26 and the circulation pump 31 based on the respective set control parameters. That is, the control unit 6 functions as one embodiment of control means in the present invention. Moreover, the control unit 6 sets the purge amount so as to increase the amount of the gas discharged from the fuel gas system 4, as the operation temperature of the fuel cell 2 rises, whereby the opening/closing operation of the gas/water discharge valve 29 is controlled based on the set purge amount.

Here, design methods of the maps (FIGS. 6A to 6C) used to set the control parameters of the fuel cell system 1 according to the present embodiment will be described with reference to FIGS. 2 to 8.

<Ordinary Temperature: Design in Low Load Region>

First, when the operation temperature of the fuel cell 2 is ordinary temperature ($T_1$), design in a typical low load region (a requested power generation current value $A_L$ with respect to the fuel cell 2) is performed. In the low load region, as shown in a flow chart of FIG. 2, a hydrogen stoichiometric ratio R is first set (a stoichiometric ratio setting step: S1). Here, the hydrogen stoichiometric ratio is a ratio of a supplied hydrogen gas amount to a consumed hydrogen gas amount (a value obtained by dividing the supplied hydrogen gas amount by the consumed hydrogen gas amount). After setting the hydrogen stoichiometric ratio R in the stoichiometric ratio setting step S1, a purge amount $E_L$ is set so that the concentration of the hydrogen gas discharged during purging is less than a predetermined environmental reference value (a purge amount setting step: S2).

Figure 3:
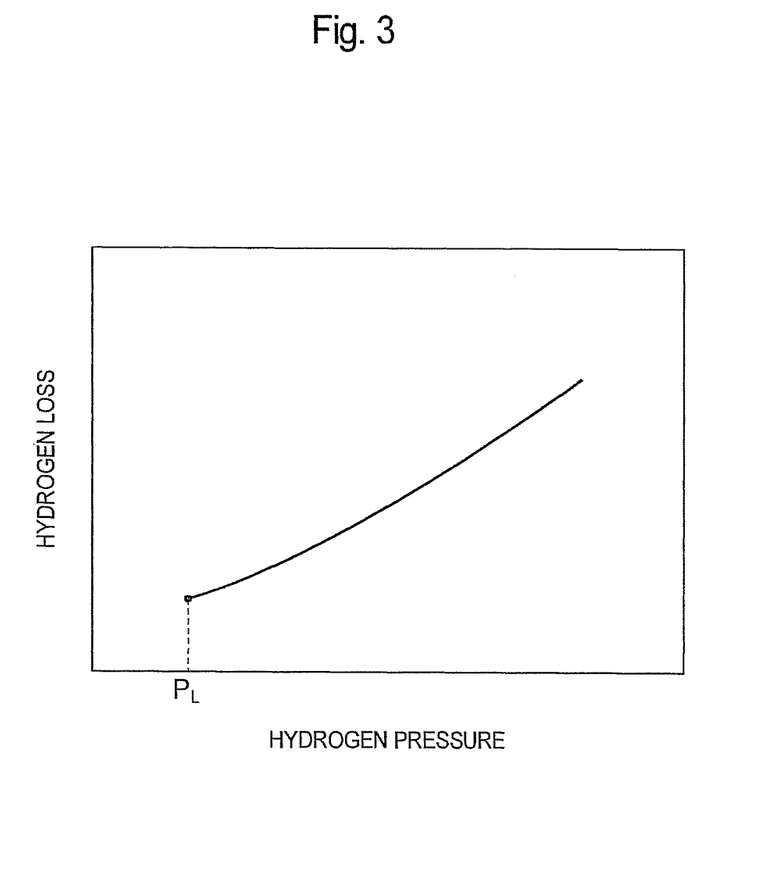
FIG. 3 is a graph for explaining the design method of the map of the fuel cell system shown in FIG. 1 (the ordinary temperature: the low load region)
Figure 4:
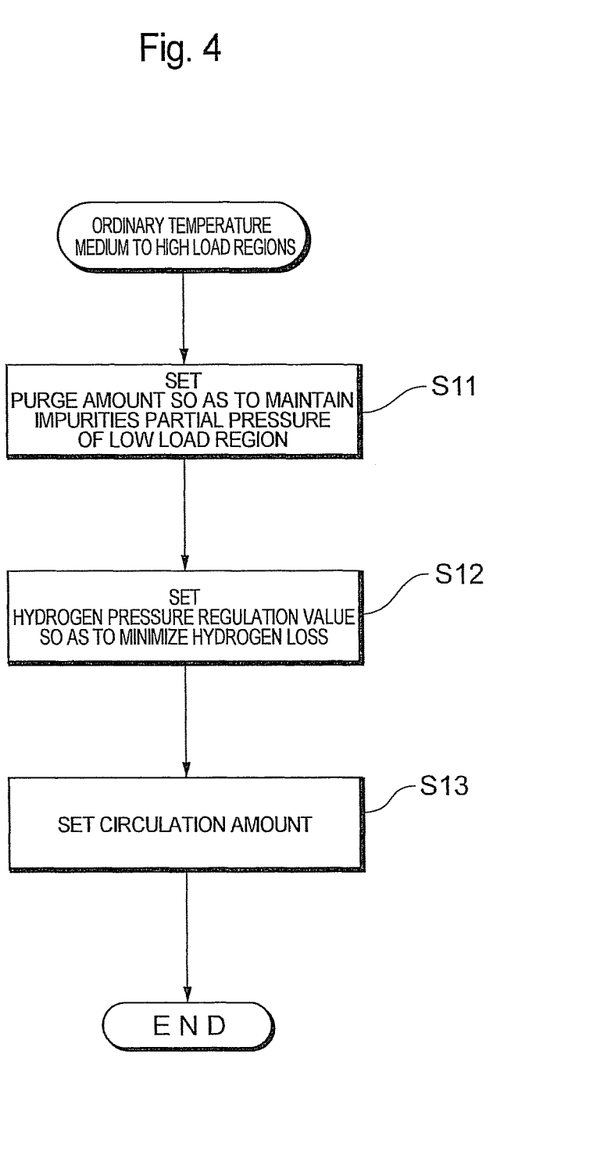
FIG. 4 is a flow chart for explaining the design method of the map of the fuel cell system shown in FIG. 1 (the ordinary temperature: medium to high load regions)
Figure 5A:
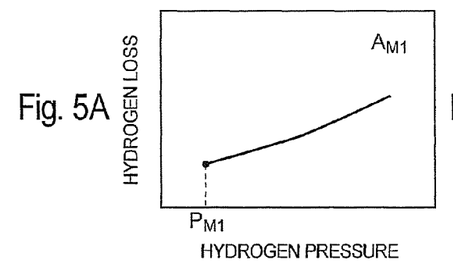
FIGS. 5A to 5G are graphs for explaining the design method of the map of the fuel cell system shown in FIG. 1 (the ordinary temperature: the medium to high load regions)
Figure 5B:
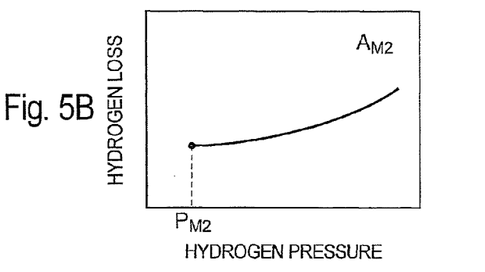
Figure 5C:
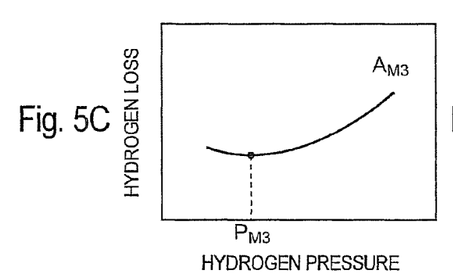
Figure 5D:
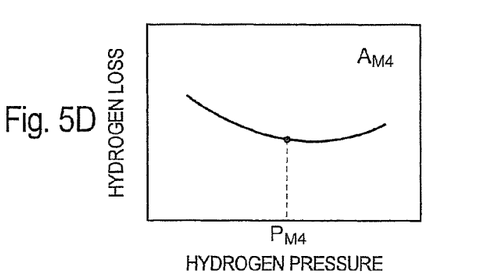
Figure 5E:
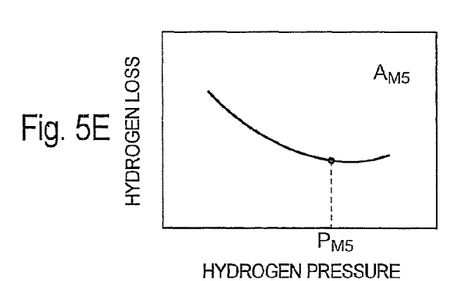
Figure 5F:
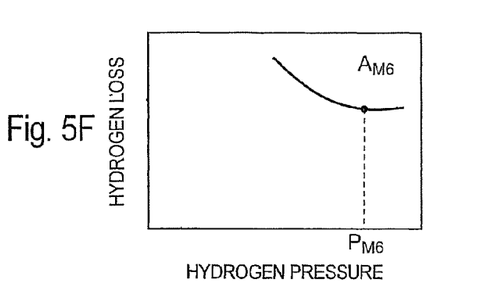
Figure 5G:
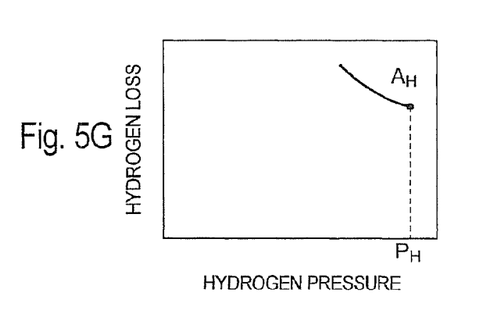

Next, a hydrogen pressure regulation value is set so as to minimize a hydrogen loss in the purge amount $E_L$ set in the purge amount setting step S2 (a hydrogen pressure regulation value setting step: S3). Here, the hydrogen loss is a value obtained by adding up a cross leak loss (a value obtained by multiplying a hydrogen permeation coefficient, an anode-side hydrogen partial pressure, a cell number and an electrode area), a hydrogen discharge loss (a value obtained by multiplying the amount of the gas discharged through the gas/water discharge valve 29 by a hydrogen concentration at an outlet of the fuel cell 2) and a circulation pump power loss (a theoretical hydrogen consumption estimated based on the power of the circulation pump 31). In the low load region, a relation between a hydrogen pressure (the supply pressure of the hydrogen gas in the hydrogen supply passage 22) and the hydrogen loss is substantially linear as shown in a graph of FIG. 3. In consequence, a minimum value $P_L$ of the hydrogen pressure in the graph of FIG. 3 is set as the hydrogen pressure regulation value.

Next, a circulation amount $C_L$ is set based on the hydrogen stoichiometric ratio R set in the stoichiometric ratio setting step S1, the purge amount $E_L$ set in the purge amount setting step S2 and the hydrogen pressure regulation value $P_L$ set in the hydrogen pressure regulation value setting step S3 (a circulation amount setting step: S4). It is to be noted that parameters such as the hydrogen stoichiometric ratio, the purge amount, the hydrogen pressure regulation value and the circulation amount are parameters concerning the operation conditions of the hydrogen circulation system of the fuel cell system 1, and have such a relation that when three of the parameters are determined, the one remaining parameter is automatically determined.

Next, impurities partial pressure $P_{NH}$ at the outlet of the fuel cell 2 in the case of an operation based on the respective parameters set in the stoichiometric ratio setting step S1 to the circulation amount setting step S4 is calculated (an impurities partial pressure calculation step: S5). Here, the impurities partial pressure is, for example, the sum of partial pressures of gases other than the hydrogen gas, for example, the nitrogen gas included in the hydrogen gas supplied from the hydrogen tank 21, the nitrogen gas which permeates the solid polymer electrolyte membrane and is supplied from the oxidizing gas system 3 to the fuel gas system 4 and water vapor formed by the power generation of the fuel cell 2. The impurities partial pressure can be calculated mainly based on the nitrogen gas partial pressure and the water vapor partial pressure. The nitrogen gas partial pressure can be calculated mainly from a nitrogen content included in the hydrogen gas supplied from the hydrogen tank 21 and a nitrogen content which permeates from the cathode side into the anode side, and the water vapor partial pressure can be calculated from a saturated water vapor pressure at the temperature of the fuel cell 2.

By the above procedure, the design in the typical low load region at the ordinary temperature (the requested power generation current value $A_L$ with respect to the fuel cell 2) is completed. The purge amount $E_L$ set in the purge amount setting step S2 is plotted in a map of FIG. 6A, the hydrogen pressure regulation value $P_L$ set in the hydrogen pressure regulation value setting step S3 is plotted in a map of FIG. 6B, and the circulation amount $C_L$ set in the circulation amount setting step S4 is plotted in a map of FIG. 6C, respectively.

<Ordinary Temperature: Design in Medium to High Load Regions>

Next, there is performed design in a load region exceeding the typical low load region, that is, a load region of requested power generation current values with respect to the fuel cell 2 from values $A_{M1}, A_{M2}, \ldots$ corresponding to a medium load region to a value $A_H$ corresponding to a high load region. In these load regions (the medium to high load regions), as shown in a flow chart of FIG. 4, purge amounts $E_{M1}, E_{M2}, \ldots, E_H$ are first set so as to maintain the impurities partial pressure $P_{NH}$ set in the impurities partial pressure calculation step S5 in the low load region (a purge amount setting step: S11).

Next, the hydrogen pressure regulation value is set so as to minimize the hydrogen loss in the purge amounts $E_{M1}, E_{M2}, \ldots, E_H$ set in the purge amount setting step S11 (a hydrogen pressure regulation value setting step: S12). In the medium load region to the high load region, a relation between the hydrogen pressure and the hydrogen loss is substantially linear or nonlinear as shown in graphs of FIGS. 5A to 5G. Therefore, such hydrogen pressures ($P_{M1}, P_{M2}, \ldots, P_H$) as to minimize the hydrogen loss in the graphs of FIGS. 5A to 5G are set as hydrogen pressure regulation values. Next, circulation amounts $C_{M1}, C_{M2}, \ldots, C_H$ are set based on the purge amounts $E_{M1}, E_{M2}, \ldots, E_H$ set in the purge amount setting step S11 and the hydrogen pressure regulation values $P_{M1}, P_{M2}, \ldots, P_H$ set in the hydrogen pressure regulation value setting step S12 (and further the hydrogen stoichiometric ratio R set in the stoichiometric ratio setting step S1) (a circulation amount setting step: S13).

By the above procedure, the design in the medium to high load regions at the ordinary temperature is completed. The purge amounts $E_{M1}, E_{M2}, \ldots, E_H$ set in the purge amount setting step S11 are plotted in the map of FIG. 6A, the hydrogen pressure regulation values $P_{M1}, P_{M2}, \ldots, P_H$ set in the hydrogen pressure regulation value setting step S12 are plotted in the map of FIG. 6B, and the circulation amounts $C_{M1}, C_{M2}, \ldots, C_H$ set in the circulation amount setting step S13 are plotted in the map of FIG. 6C, respectively, thereby completing the design of the maps in the entire load region. It is to be noted that the impurities partial pressure $P_{NH}$ in the entire load region is constant as shown in a graph of FIG. 7.

<High Temperature: Design in Entire Load Region>

Next, design in a case where the operation temperature of the fuel cell 2 is a temperature ($T_2$) higher than the ordinary temperature ($T_1$) is performed. At such a high temperature, as shown in a flow chart of FIG. 8, an impurities partial pressure $P_{NH}'$ at the outlet of the fuel cell 2 in the case of an operation based on the respective parameters (the purge amount $E_L$, the hydrogen pressure regulation value $P_L$ and the circulation amount $C_L$) set in the typical low load region at the ordinary temperature is first calculated (an impurities partial pressure calculation step: S21). The impurities partial pressure $P_{NH}'$ calculated in the impurities partial pressure calculation step S21 at the high temperature is higher than the impurities partial pressure $P_{NH}$ calculated in the impurities partial pressure calculation step S5 at the ordinary temperature, because the water vapor partial pressure increases owing to the rise of the operation temperature of the fuel cell 2.

Figure 8:
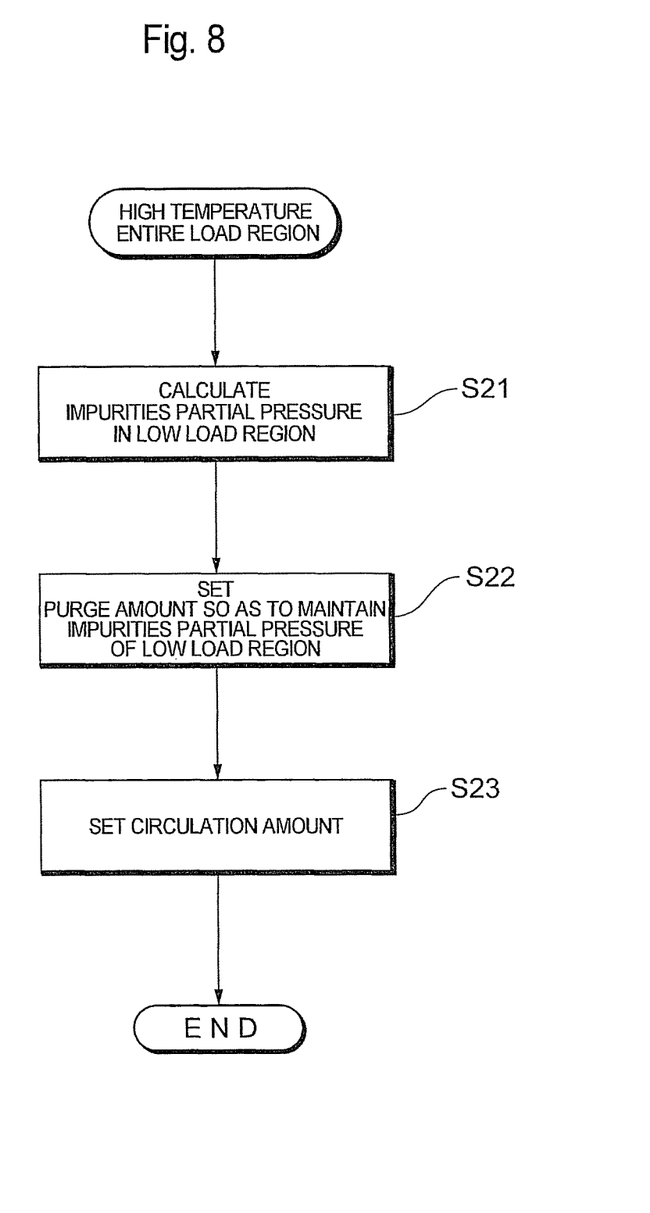
FIG. 8 is a flow chart for explaining the design method of the map of the fuel cell system shown in FIG. 1 (a high temperature: the entire load region)

Next, purge amounts $E_{M1}', E_{M2}', \ldots, E_H'$ are set so as to maintain the impurities partial pressure $P_{NH}'$ set in the impurities partial pressure calculation step S21 (a purge amount setting step: S22). Afterward, circulation amounts $C_{M1}'$, $C_{M2}'$, ..., $C_H'$ are set based on the purge amounts $E_{M1}'$, $E_{M2}'$, ..., $E_H'$ set in the purge amount setting step S22 and the hydrogen pressure regulation values $P_{M1}$, $P_{M2}$, ..., $P_H$ (and further the hydrogen stoichiometric ratio R set in the stoichiometric ratio setting step S1) (a circulation amount setting step: S23). It is to be noted that in the present embodiment, the hydrogen pressure regulation values $P_{M1}$, $P_{M2}$, ..., $P_H$ at the ordinary temperature are also employed at the high temperature for the sake of the simplicity of the design.

By the above procedure, the design in the entire load region at the high temperature is completed. When the purge amounts $E_{M1}'$, $E_{M2}'$, ..., $E_H'$ set in the purge amount setting step S22 are plotted in the map of FIG. 6A, it is seen that the purge amount at the high temperature ($T_2$: a broken line) increases as compared with the purge amount at the ordinary temperature ($T_1$: a solid line).

Figure 9:
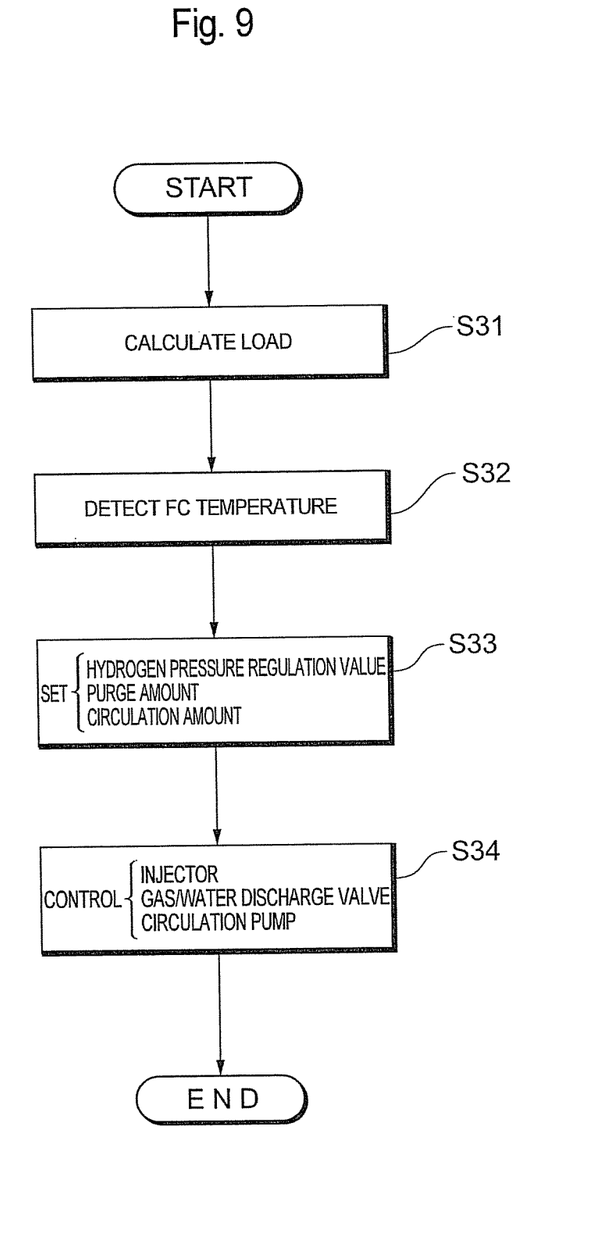
FIG. 9 is a flow chart for explaining a control method of the fuel cell system shown in FIG. 1.

Next, a control method of the fuel cell system 1 according to the present embodiment will be described with reference to a flow chart of FIG. 9.

First, the control unit 6 of the fuel cell system 1 receives a signal from an accelerator sensor or the like provided in the vehicle, and calculates the load (the requested power generation current value) with respect to the fuel cell 2 (a load calculation step: S31). Then, the control unit 6 detects the operation temperature of the fuel cell 2 by use of the temperature sensor 2a (a temperature detection step: S32).

Figure 6A:
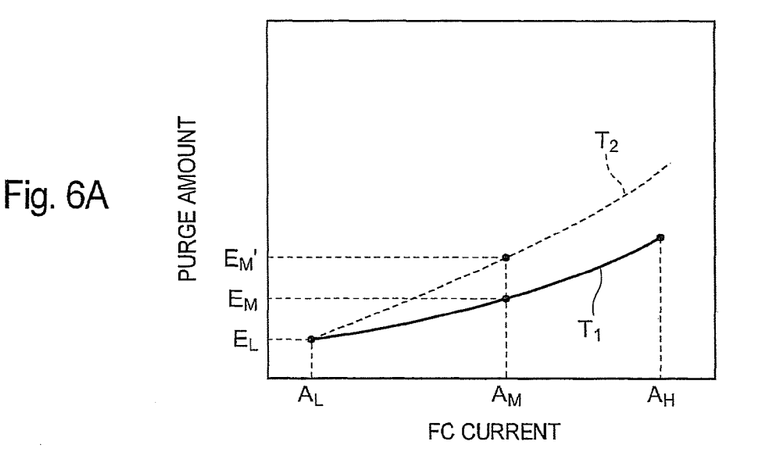
FIG. 6A is a map used to set control parameters of the fuel cell system shown in FIG. 1 (a map showing a relation between a load and a purge amount)
Figure 6B:
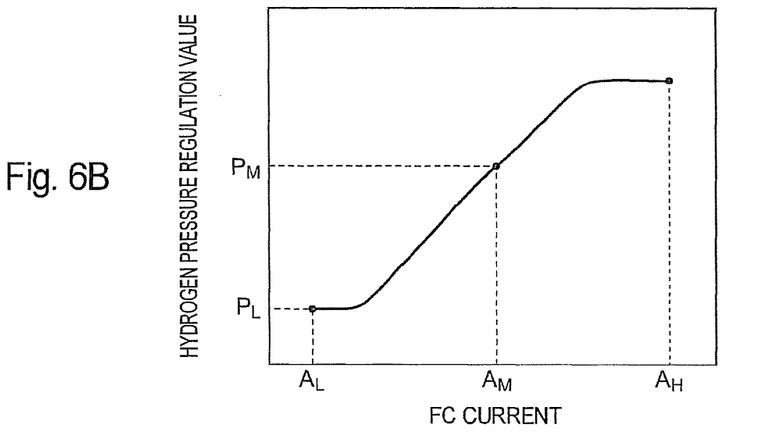
FIG. 6B is a map used to set the control parameters of the fuel cell system shown in FIG. 1 (a map showing a relation between the load and a hydrogen pressure regulation value)
Figure 6C:
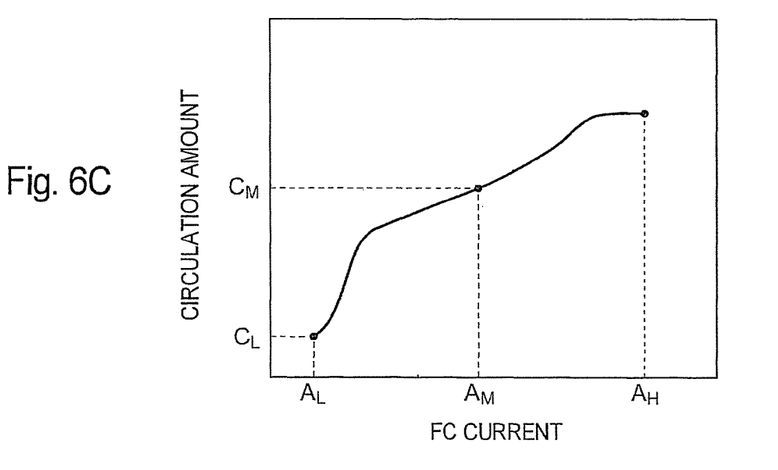
FIG. 6C is a map used to set the control parameters of the fuel cell system shown in FIG. 1 (a map showing a relation between the load and a circulation amount)
Figure 7:
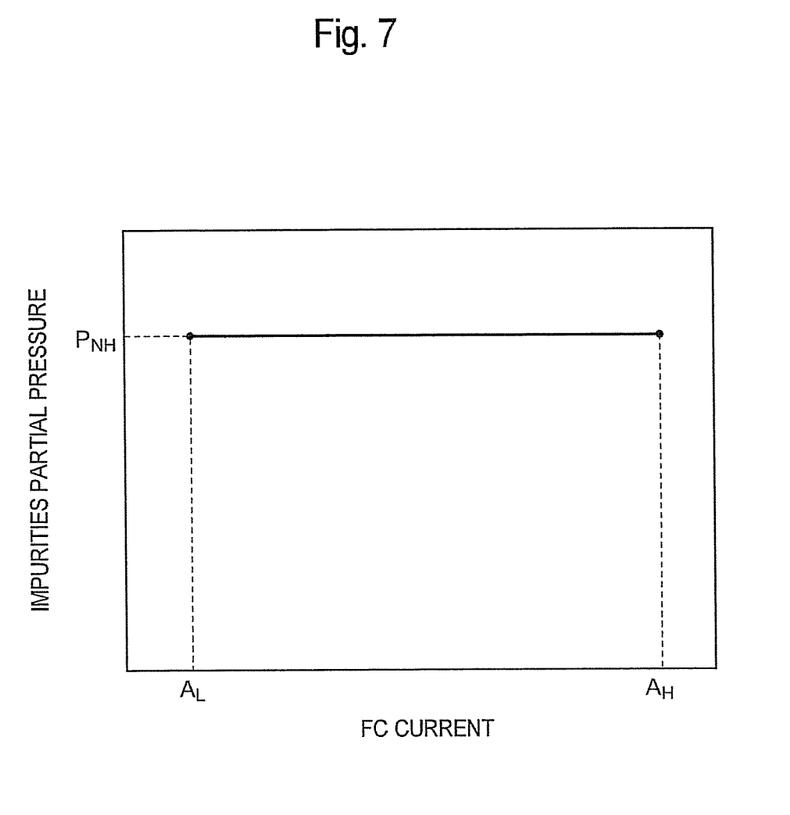
FIG. 7 is a graph showing impurities partial pressure in the entire load region of the fuel cell system shown in FIG. 1.

Next, the control unit 6 sets the purge amount, the hydrogen pressure regulation value and the circulation amount based on the load calculated in the load calculation step S31, the temperature detected in the temperature detection step S32 and the maps of FIGS. 6A to 6C (a control parameter setting step: S33). For example, when the calculated load is $A_M$ and the detected temperature is $T_1$, as shown in FIGS. 6A to 6C, the purge amount is set to $E_M$, the hydrogen pressure regulation value is set to $P_M$, and the circulation amount is set to $C_M$, respectively. Moreover, when the calculated load is $A_M$ and the detected temperature is $T_2$, as shown in FIG. 6A, the purge amount is set to $E_M'$.

Subsequently, the control unit 6 controls the operations of the injector 26, the gas/water discharge valve 29 and the circulation pump 31 based on the respective control parameters (the purge amount, the hydrogen pressure regulation value and the circulation amount) set in the control parameter setting step S33 (a circulation control step: S34). In the circulation control step S34, the control unit 6 calculates the amount of the gas discharged from a time when the gas/water discharge valve 29 is opened, and closes the gas/water discharge valve 29, when the calculated gas discharge amount reaches the set purge amount. Moreover, in the circulation control step S34, the control unit 6 calculates a deviation between the pressure value of the hydrogen gas detected by the pressure sensor 27 and the set hydrogen pressure regulation value, and performs the feedback control of the injector 26 so as to decrease this deviation. Furthermore, in the circulation control step S34, the control unit 6 controls the rotation number of the circulation pump 31 so that the flow rate of the gas fed from the circulation pump 31 to the hydrogen supply passage 22 becomes the set circulation amount.

In the fuel cell system 1 according to the above embodiment, the opening/closing operation of the gas/water discharge valve 29 can be controlled so that the impurities partial pressure in the fuel gas system 4 is constant in the entire load region. Therefore, the shortage of the stoichiometric ratio of the hydrogen gas due to the fluctuation of the impurities partial pressure during the fluctuation of the load can be inhibited. In consequence, the stable operation state of the fuel cell 2 can be maintained also during the fluctuation of the load.

Moreover, in the fuel cell system 1 according to the above embodiment, the opening/closing operation of the gas/water discharge valve 29 can be controlled so as to increase the amount (the purge amount) of the gas discharged from the fuel gas system 4, as the operation temperature of the fuel cell 2 rises. Therefore, even when the water vapor in the fuel gas system 4 increases owing to the rise of the operation temperature of the fuel cell 2, the increased water vapor can effectively be discharged.

Furthermore, in the fuel cell system 1 according to the above embodiment, the amount (the purge amount) of the gas discharged through the gas/water discharge valve 29, the pressure (the hydrogen pressure regulation value) of the hydrogen gas supplied from the injector 26 to the fuel cell 2 and the flow rate (the circulation amount) of the gas fed to the hydrogen supply passage 22 by the circulation pump 31 can be set so as to minimize the amount of the hydrogen gas discharged from the fuel gas system 4. Therefore, the loss of the hydrogen gas can be decreased, and the fuel can be saved.

It is to be noted that in the above embodiment, an example in which the gas/water discharge valve 29 for realizing both gas discharge and water discharge is employed as the purge valve has been described, but a water discharge valve for discharging the water taken by the gas-liquid separator 28 to the outside and a gas discharge valve (the purge valve) for discharging the gas of the circulation passage 23 to the outside may separately be provided, and the control unit 6 may control the gas discharge valve.

INDUSTRIAL APPLICABILITY

A fuel cell system according to the present invention can be mounted in a fuel cell vehicle as described in the above embodiment, and may be mounted in various mobile bodies (a robot, a ship, an airplane, etc.) other than the fuel cell vehicle. Moreover, the fuel cell system according to the present invention may be applied to a stational power generation system used as a power generation facility for a construction (a housing, a building or the like).

The invention claimed is:

1. A fuel cell system comprising:
a fuel cell;
a fuel gas system which supplies a fuel gas to the fuel cell and circulates the gas discharged from the fuel cell;
a purge valve which discharges the gas from the fuel gas system; and a control device that controls the opening/closing operation of the purge valve,
wherein a partial pressure of impurities in the fuel gas system is increased more than in a case of ordinary temperature, when the operation temperature of the fuel cell is higher than the ordinary temperature, and
wherein the control device controls the opening/closing operation of the purge valve so that partial pressure of impurities in the fuel gas system is constant in the entire load region, in a case where the operation temperature of the fuel cell is the ordinary temperature, and so that the partial pressure of impurities in the fuel gas system is constant in the entire load region, in a case where the operation temperature of the fuel cell is higher than the ordinary temperature, wherein the control device controls the opening/closing operation of the purge valve so as to increase the amount of the gas discharged from the fuel gas system, as the operation temperature of the fuel cell rises.

2. The fuel cell system according to claim 1, wherein the fuel gas system comprises:
   a fuel gas supply passage through which the fuel gas supplied from a fuel supply source flows to the fuel cell;
   a circulation passage through which the gas discharged from the fuel cell is circulated to the fuel gas supply passage;
   an on/off valve which regulates a gas pressure on the upstream side of the fuel gas supply passage to supply the gas to the downstream side; and
   a circulation pump which forcibly feeds the gas circulated through the circulation passage to the fuel gas supply passage, and
   wherein the control device sets the amount of the gas discharged through the purge valve, the pressure of the fuel gas supplied from the on/off valve to the fuel cell, and the flow rate of the gas fed to the fuel gas supply passage by the circulation pump so that the amount of the fuel gas discharged from the fuel gas system is at a minimum.

3. The fuel cell system according to claim 2, wherein the on/off valve is an injector.

* * * * *